United States Patent
Kaneko et al.

(10) Patent No.: US 9,846,511 B2
(45) Date of Patent: Dec. 19, 2017

(54) INPUT DEVICE AND CONTROL METHOD USING INPUT DEVICE

(71) Applicant: ALPS ELECTRIC CO., LTD., Tokyo (JP)

(72) Inventors: Masafumi Kaneko, Niigata-ken (JP); Masahiko Ishizone, Niigata-ken (JP); Takashi Sato, Niigata-ken (JP); Eiji Umetsu, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 59 days.

(21) Appl. No.: 14/625,415

(22) Filed: Feb. 18, 2015

(65) Prior Publication Data

US 2015/0160783 A1 Jun. 11, 2015

Related U.S. Application Data

(63) Continuation of application No. PCT/JP2013/076982, filed on Oct. 3, 2013.

(30) Foreign Application Priority Data

Oct. 5, 2012 (JP) .................................. 2012-222619

(51) Int. Cl.
*G06F 3/041* (2006.01)
*G06F 3/044* (2006.01)

(52) U.S. Cl.
CPC ............ *G06F 3/0418* (2013.01); *G06F 3/041* (2013.01); *G06F 3/044* (2013.01); *G06F 3/0414* (2013.01); *G06F 2203/04105* (2013.01); *G06F 2203/04106* (2013.01)

(58) Field of Classification Search
CPC ...... G06F 3/0418; G06F 3/0414; G06F 3/041; G06F 3/044; G06F 2203/04106; G06F 2203/04105
See application file for complete search history.

(56) References Cited

U.S. PATENT DOCUMENTS

| | | | |
|---|---|---|---|
| 2006/0001654 A1 | 1/2006 | Smits | |
| 2008/0250864 A1* | 10/2008 | Shipton | G01D 5/3473 73/780 |
| 2011/0080349 A1* | 4/2011 | Holbein | G06F 1/3203 345/173 |

(Continued)

FOREIGN PATENT DOCUMENTS

| | | |
|---|---|---|
| JP | 08-328727 | 12/1996 |
| JP | 09-146689 | 6/1997 |

(Continued)

OTHER PUBLICATIONS

International Search Report from International Application No. PCT/JP2013/076982 dated Dec. 17, 2013.

*Primary Examiner* — Aneeta Yodichkas

(74) *Attorney, Agent, or Firm* — Beyer Law Group LLP

(57) ABSTRACT

An input device includes a position detection sensor capable of detecting an input operation position of an operation body on an operation surface, a load detection sensor capable of detecting a load in the input operation position, and a control unit capable of executing offset calibration to correct an offset of an output of the load detection sensor based on input operation information resulting from an output of the position detection sensor.

5 Claims, 6 Drawing Sheets

(56) References Cited

U.S. PATENT DOCUMENTS

| | | | |
|---|---|---|---|
| 2011/0080367 A1* | 4/2011 | Marchand | G06F 1/3215 345/174 |
| 2011/0084932 A1* | 4/2011 | Simmons | G06F 3/0414 345/174 |
| 2013/0234968 A1 | 9/2013 | Yanagi et al. | |

FOREIGN PATENT DOCUMENTS

| | | |
|---|---|---|
| JP | 2006-146681 | 6/2006 |
| JP | 2008-153025 | 7/2008 |
| JP | 2009-087311 | 4/2009 |
| JP | 2010-211399 | 9/2010 |
| JP | 2012-123695 | 6/2012 |
| WO | 2012/056795 | 12/2013 |

* cited by examiner

INPUT DEVICE AND CONTROL METHOD USING INPUT DEVICE

CLAIM OF PRIORITY

This application is a Continuation of International Application No. PCT/JP2013/076982 filed on Oct. 3, 2013, which claims benefit of Japanese Patent Application No. 2012-222619 filed on Oct. 5, 2012. The entire contents of each application noted above are hereby incorporated by reference.

BACKGROUND OF THE INVENTION

1. Field of the Invention

The present invention relates to an input device mounted on a portable device or another electronic device and operated by causing an operation body such as a finger to come into contact with an operation panel.

2. Description of the Related Art

Japanese Unexamined Patent Application Publication No. 2009-87311 discloses an input device that detects a movement position using a capacitance sensor and detects an amount of pressing using a distortion sensor.

Further, Japanese Unexamined Patent Application Publication No. 2010-211399 discloses an information processing device having a pressure sensor and a capacitive touch panel. In Japanese Unexamined Patent Application Publication No. 2010-211399, a threshold of pressing force is set and presence or absence of pressing is determined Japanese Unexamined Patent Application Publication Nos. 9-146689 and 8-328727 disclose that a sampling rate decreases (increases) when there is no coordinate input within a constant time. However, Japanese Unexamined Patent Application Publication Nos. 9-146689 and 8-328727 do not disclose an input device including a capacitance sensor, and a force sensor that measures pressing force.

Incidentally, there is a problem in that an output of the force sensor causes offset drift due to a change in a stress applied to a device with an input device, a change in a temperature, a change in a device shape over time, or the like. Further, when edges of the input device are held with one hand and an input operation surface is operated with fingers of the other hand, some load is applied to the force sensor at a time point at which the edges of the input device are held with the hand. Accordingly, the force sensor is not accurately driven, detection precision is degraded, and power consumption increases.

Information and timing used to efficiently perform calibration for offsetting an output of the force sensor in an input device including the capacitance sensor and the force sensor are not particularly described in each Patent Literature.

SUMMARY OF THE INVENTION

Therefore, the present invention provides, particularly, an input device, and a control method using the input device capable of efficiently performing offset calibration.

According to an aspect of the present invention, an input device includes a position detection sensor capable of detecting an input operation position of an operation body on an operation surface; a load detection sensor capable of detecting a load in the input operation position; and a control unit capable of executing offset calibration to correct an offset of an output of the load detection sensor based on input operation information resulting from an output of the position detection sensor.

Further, according to another aspect of the present invention, a control method using an input device includes a position detection sensor capable of detecting an input operation position of an operation body on an operation surface, a load detection sensor capable of detecting a load in the input operation position, and a control unit, in which the control unit executes offset calibration to correct an offset of an output of the load detection sensor based on input operation information resulting from an output of the position detection sensor.

According to the aspect of the present invention, it is possible to efficiently execute the offset calibration for the load detection sensor by using input operation information resulting from the output of the position detection sensor. Here, the input operation information refers to a determination as to whether or not the operation body such as a finger comes in contact with the operation surface or whether the position coordinate is detected or not.

In the aspect of the present invention, it is preferable that when an input operation is not detected based on the output of the position detection sensor, the offset calibration is executed, and when the input operation is detected, the offset calibration is stopped and the load in the input operation position is detected based on the output of the load detection sensor. Accordingly, it is possible to efficiently perform execution of the calibration and detection of the load.

Alternatively, in the aspect of the present invention, it is preferable that the load detection sensor is in a standby state until the input operation is detected based on output of the position detection sensor, and when the input operation is detected, the offset calibration is executed and a load in the input operation position is detected based on the output of the load detection sensor. In an embodiment of the present invention, the load detection sensor is in a standby state, and if the input operation is detected based on the output of the capacitive touch panel sensor, the output of the load detection sensor is immediately read and the offset calibration is executed. Accordingly, it is possible to speedily execute the offset calibration and to cause smooth transition from the offset calibration to a load detection step.

Further, in the aspect of the present invention, it is preferable that a sampling rate for the output of the load detection sensor acquired at the time of the offset calibration is at a lower frequency than a sampling rate for the output of the load detection sensor acquired when the load is detected. Accordingly, it is possible to reduce power consumption at the time of calibration, prevent loss of data for the load detection, and perform the load detection without delay.

Further, in the aspect of the present invention, it is preferable that the position detection sensor and the load detection sensor are connected to a host IC as the control unit, and the host IC outputs an instruction so that a sensor driving IC constituting the load detection sensor corrects the offset, or an offset value is stored in the host IC and the offset calibration is executed for the output acquired from the load detection sensor.

With the input device, and the control method using the input device according to the aspect of the present invention, it is possible to efficiently execute the offset calibration for the load detection sensor by using input operation information resulting from the output of the position detection sensor.

BRIEF DESCRIPTION OF THE DRAWINGS

FIG. 3A is partial longitudinal sectional view, and FIG. 3B is a back perspective view of a sensor substrate constituting the load detection sensor;

DESCRIPTION OF THE PREFERRED EMBODIMENTS

Figure 1:
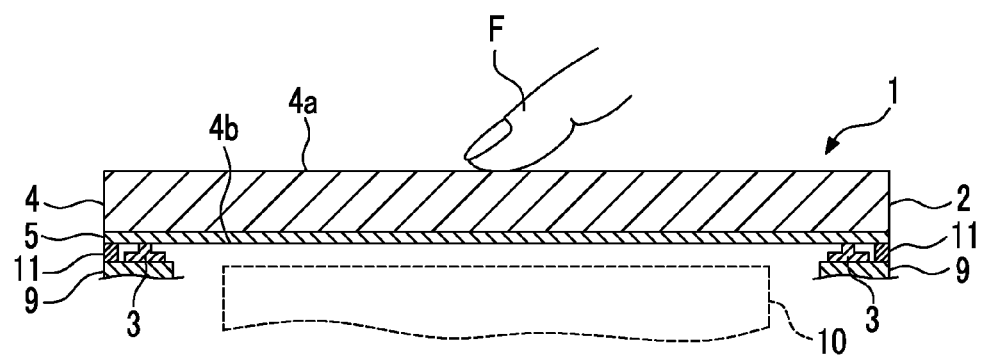
FIG. 1 is a partial longitudinal sectional view of an input device (touch panel) in an embodiment of the present invention.
Figure 2:
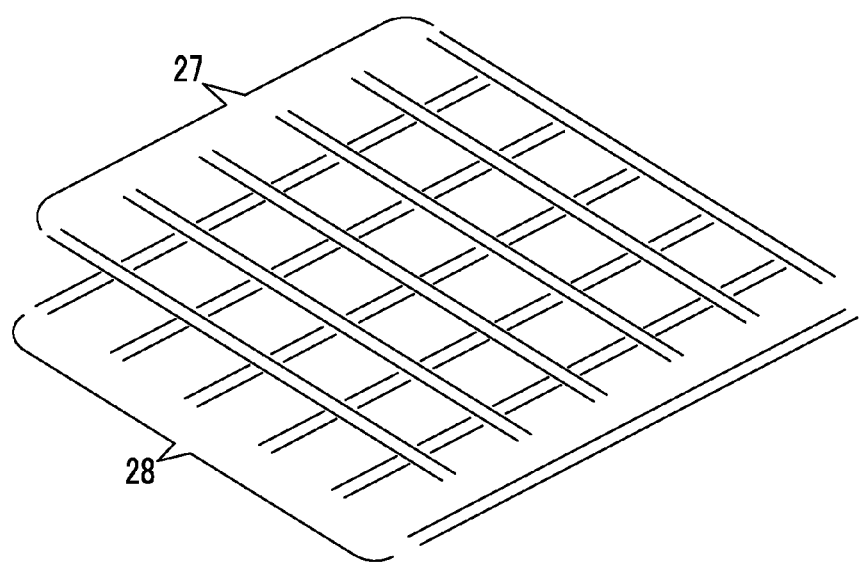
FIG. 2 is an illustrative diagram of a capacitive touch panel sensor.
Figure 3A:
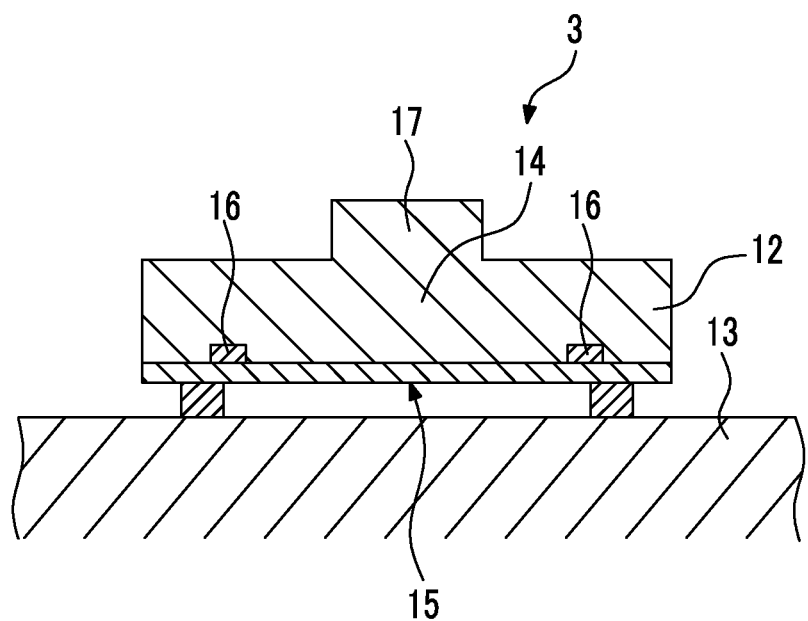
FIGS. 3A and 3B are illustrative diagrams of a load detection sensor (force sensor)
Figure 3B:
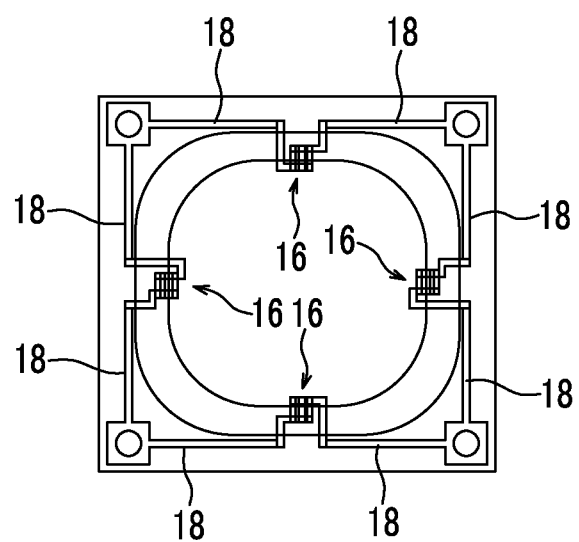
Figure 4:
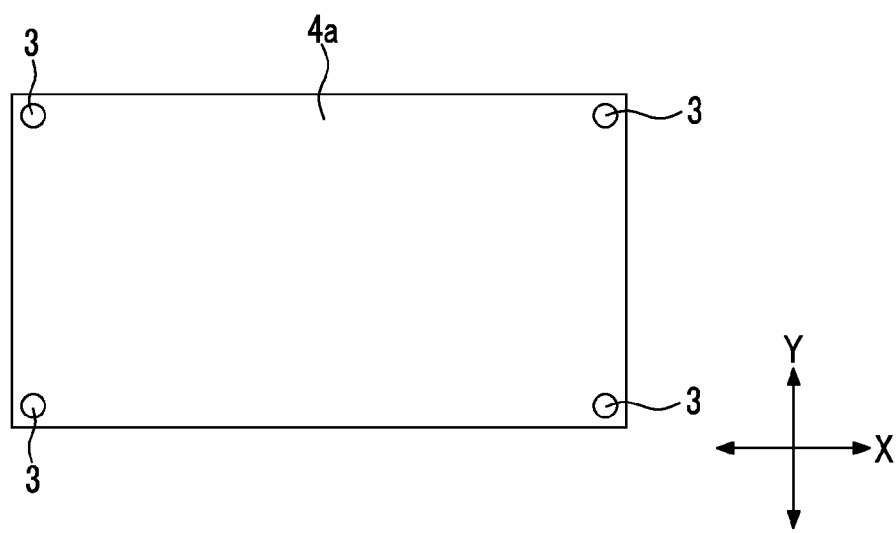
FIG. 4 is a plan view of the input device of this embodiment.

FIG. 1 is a partial longitudinal sectional view of an input device (touch panel) in an embodiment of the present invention, FIG. 2 is an illustrative diagram of a capacitive touch panel sensor, FIGS. 3A and 3B are illustrative diagrams of a load detection sensor (force sensor), FIG. 3A is partial longitudinal sectional view, FIG. 3B is a back perspective view of a sensor substrate constituting the load detection sensor, and FIG. 4 is a plan view of an input device of this embodiment.

The input device (touch panel) 1 in this embodiment includes a plurality of load detection sensors (force sensors) 3 on the back surface side of a capacitive touch panel sensor (position detection sensor) 2.

The capacitive touch panel sensor 2 is configured to include a transparent operation panel 4, and a sensor layer 5 provided on a back surface 4b of the operation panel 4, as illustrated in FIG. 1. The operation panel 4 is formed of glass, plastic, or the like. A surface of the operation panel 4 is an operation surface 4a.

The sensor layer 5 includes, for example, an X electrode 27 and a Y electrode 28 that are formed of an ITO, as illustrated in FIG. 2. The X electrode 27 is insulated from the Y electrode 28. Further, the X electrode 27 is orthogonal to the Y electrode 28. When the operation surface 4a is pressed with an operation body F such as a finger, capacitance between the operation body and the respective electrodes 27 and 28 is changed. An input operation position of the operation body F can be detected based on this capacitance change. A configuration of the sensor layer 5 is not limited to that in FIG. 2. The electrode may be configured in a two-layered structure of the X electrode 27 and the Y electrode 28, as illustrated in FIG. 2, or may be configured in a one-layered structure. Further, a resistive film type or the like may be used in place of the capacitive type.

The load detection sensor 3 includes a sensor substrate 12, and a base surface 13, as illustrated in FIGS. 3A and 3B. A displacement portion 14, and a projection-shaped pressure reception portion 17 that projects upward on an upper surface of the displacement portion 14 are provided in the sensor substrate 12. A predetermined space portion 15 is formed between the sensor substrate 12 and the base surface 13, and accordingly, the displacement portion 14 is able to be displaced in a height direction when the displacement portion 14 receives a load. A plurality of piezoresistive elements 16 are provided as distortion detection elements in a back surface of the sensor substrate 12, as illustrated in FIGS. 3A and 3B. When the displacement portion 14 is displaced in the height direction due to the load received by the pressure reception unit 17, resistance of each piezoresistive element 16 is changed according to a displacement amount, a middle point potential of a bridge circuit including the respective piezoresistive elements 16 is changed, and thus, a sensor output can be obtained. A wiring portion 18 drawn from each piezoresistive element 16 as illustrated in FIG. 3B is electrically connected to a pad portion (not illustrated).

The load detection sensor 3 in this embodiment may have a configuration other than the configuration illustrated in FIGS. 3A and 3B. For example, the load detection sensor 3 may have a configuration in which when the operation surface 4a is pressed, capacitance is changed based on a change in the distance between the two electrodes, and a load is able to be detected based on this capacitance change.

The load detection sensors 3 are arranged on the back surface side of the capacitive touch panel sensor 2, as illustrated in FIG. 1. The load detection sensors 3 are arranged, for example, at four corners of a peripheral portion of the operation surface 4a, as illustrated in FIG. 4. Further, a support portion 9 that supports the load detection sensors 3 is included, and this support portion 9 and the capacitive touch panel sensor 2 are connected by a connection portion 11 that is deformable in a height direction, as illustrated in FIG. 1. Accordingly, when the operation surface 4a is pressed, the operation panel 4 is moved downward and is able to apply a load to the load detection sensor 3. The connection portion 11 is, for example, a double-sided tape.

Further, a support structure of the load detection sensors 3 in the touch panel 1 is not limited to the structure illustrated in FIG. 1. Further, positions of the load detection sensors 3 in the touch panel 1 are not limited to those illustrated in FIG. 4, and the load detection sensors 3 may be arranged, for example, in central portions of respective sides in the peripheral portion of the touch panel 1 and are able to be appropriately arranged in places in which a load of pressing force is able to be appropriately detected. Further, the number of load detection sensors 3 is not limited.

Figure 5:
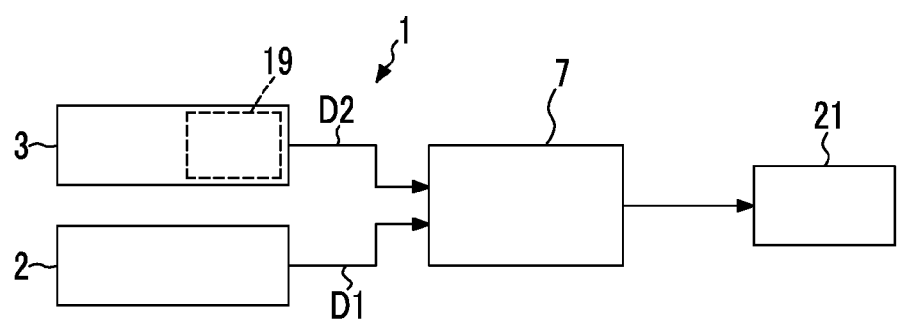
FIG. 5 is a block diagram of the input device in this embodiment.

Each of the capacitive touch panel sensor 2 and the load detection sensor 3 constituting the touch panel 1 is connected to a host IC (control unit) 7, as illustrated in FIG. 5. Further, data from the host IC 7 is able to be transmitted to an image processing unit 21 of a device body portion.

When an input operation is performed with respect to the operation surface 4a with the operation body F such as a finger as illustrated in FIG. 1, a first signal D1 based on the change in the capacitance is output from the capacitive touch panel sensor 2 to the host IC. The host IC 7 determines whether the operation body F comes in contact with the operation surface 4a or not, as illustrated in (b) of FIG. 8, based on the first signal D1. Further, the host IC 7 is able to obtain a position coordinate (X, Y) of the input operation position of the operation body F based on the output from the capacitive touch panel sensor 2.

When the operation surface 4a is pressed with the operation body F, a second signal D2 is output from the load detection sensor 3 to the host IC 7. An output (analog signal) from the load detection sensor 3, in which a horizontal axis indicates a time, is illustrated in (a) of FIG. 8. The host IC 7 which acquires the output (analog signal) from the load detection sensor 3 determines that the operation surface 4a has been pressed when an output value is greater than a previously set threshold illustrated in (a) of FIG. 8 based on the threshold, and determines that the operation surface 4a has not been pressed when the output value is smaller than the threshold.

Also, the host IC 7 is able to obtain the load of the input operation position based on the output of the load detection sensor 3. How to calculate the load based on the output of the load detection sensor 3 is not particularly limited. For example, the load can be obtained by averaging output values of the plurality of respective load detection sensors 3. Also, each pieces of data of a load value or the position coordinate (X, Y) in the input operation position of the operation body F is transmitted to the image processing unit 21 illustrated in FIG. 5, and the image processing unit 21 performs an image displaying process of a liquid crystal display 10 (see FIG. 1) based on the transmitted data.

Next, offset calibration or the like will be described using a flowchart illustrated in FIG. 6.

Figure 6:
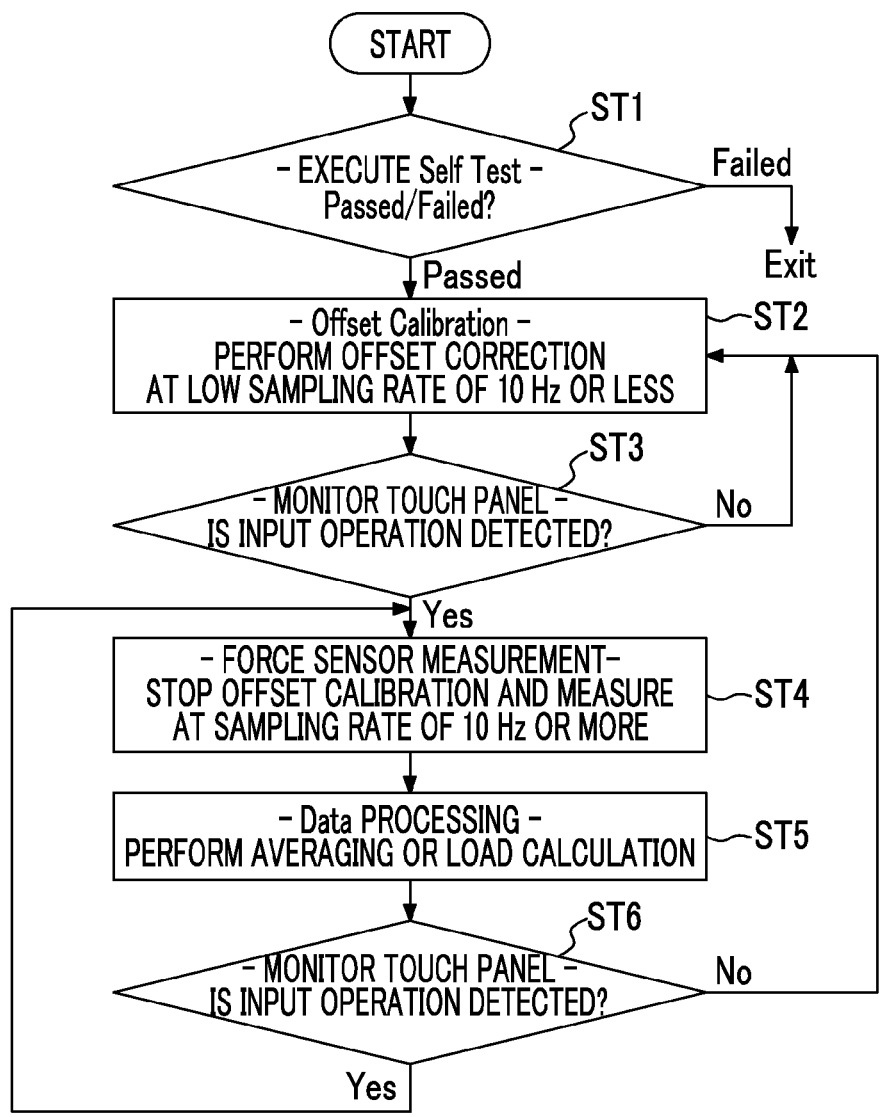
FIG. 6 is a flowchart diagram including calibration, a load detection step, and the like according to a first embodiment.

First, self-test is executed, as illustrated in FIG. 6 (step ST1). In the self-test, for example, it is tested whether an IC soundly operates.

If the self-test is passed, then the host IC 7 executes the offset calibration (step ST2).

In the offset calibration, for example, the output of the load detection sensor 3 is measured at a low sampling rate of 10 Hz or less and the offset correction is performed. The offset correction will be described below.

Then, it is monitored whether an input operation has been performed based on the output of the capacitive touch panel sensor 2. Here, the input operation refers to a state in which the operation body F such as a finger is determined to have come in contact with the operation surface 4a as illustrated in (b) of FIG. 8 or a state in which the position coordinate (X, Y) of the operation body F has been obtained.

Figure 8:
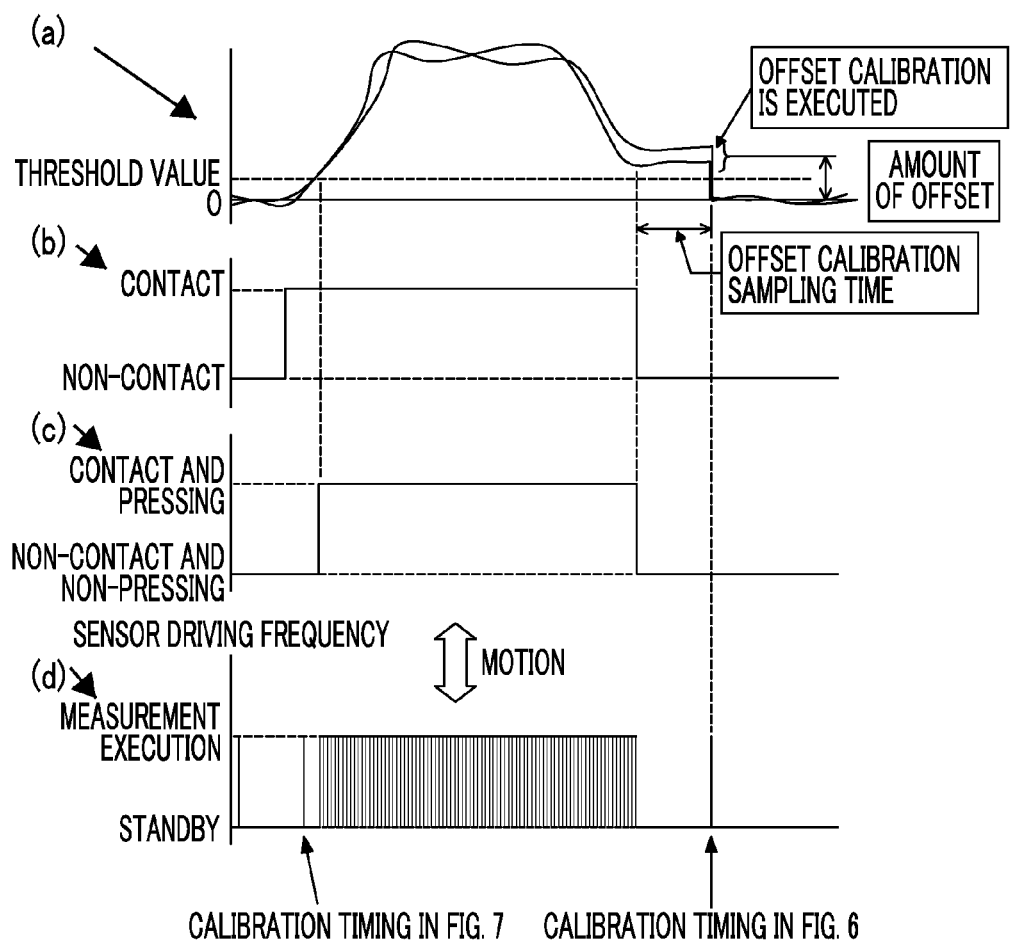
FIG. 8 illustrates a timing chart of a specified value of a load detection sensor, a capacitive touch panel sensor, and a sensor driving frequency.

When the input operation is not detected in step ST3, that is, when the operation body F is determined to have not come in contact with the operation surface 4a illustrated in (b) of FIG. 8 or the position coordinate (X, Y) of the operation body F has not been obtained, the process returns to the offset calibration of step ST2 again.

When the finger operation body F is determined to have come in contact, a sampling time of the offset calibration is started, as illustrated in (a) and (b) of FIG. 8. In this case, for example, the output of the load detection sensor 3 is measured at a low sampling rate of 10 Hz or less, as described above (also see (d) of FIG. 8).

An offset drift is generated in the output from the load detection sensor due to various factors, as illustrated in (a) of FIG. 8. Causing an amount of this offset to be zero is the offset calibration. The host IC 7 acquires the output of the load detection sensor 3 at a low sampling rate at the time of offset calibration, and executes the offset calibration at a timing illustrated in (a) and (d) of FIG. 8. By executing the offset calibration, the output value of the load detection sensor then returns to substantially 0. The offset calibration is repeatedly performed several times at a low sampling rate until the process transitions to next step ST4. Incidentally, for a method of causing the amount of the offset to be zero, for example, an instruction to correct the offset is output from the host IC 7 to the sensor driving IC 19 constituting the load detection sensor 3 (hard calibration). Accordingly, the offset can be corrected in the load detection sensor 3, and an analog output (second signal D2) in which the amount of the offset illustrated in (a) of FIG. 8 has been canceled can be transmitted to the host IC 7. Alternatively, the amount of offset illustrated in (a) of FIG. 8 is stored in the host IC, and offset correction can be performed, in the host IC 7, on the analog output (second signal D2) with the offset amount transmitted from the load detection sensor 3 to the host IC (soft calibration).

As illustrated in FIG. 6, in step ST3, when the input operation is detected based on the output (first signal D1) of the capacitive touch panel sensor 2, that is, when it is determined that the operation body F comes in contact with the operation surface 4a or the position coordinate (X, Y) is detected, the process transitions to step ST4. In step ST4, the offset calibration is stopped, and the output of the load detection sensor 3 is acquired at a sampling rate of a higher frequency (for example, 10 Hz or more) than that in the offset calibration.

A sensor driving frequency is illustrated in (d) of FIG. 8. As illustrated in (c) and (d) of FIG. 8, when it is determined that the operation body F contacts and presses the operation surface 4a, the host IC 7 acquires the output of the load detection sensor 3 at a sampling rate of a high frequency. On the other hand, when it is determined that the operation surface 4a does not contact and press the operation body F, the host IC 7 acquires the output of the load detection sensor 3 at a sampling rate of a low frequency and executes the offset calibration described above.

Then, in step ST5 of FIG. 6, data processing is executed to perform output averaging or load calculation.

Then, it is monitored in step ST6 of FIG. 6 whether the input operation continues based on the output of the capacitive touch panel sensor 2, and the process returns to step ST4 when the input operation continues. On the other hand, when it is determined that the input operation does not continue, that is, the operation body F does not contact and press the operation surface 4a as illustrated in (b) of FIG. 8 or (c) of FIG. 8, the process returns to the offset calibration of step ST2 again.

Figure 7:
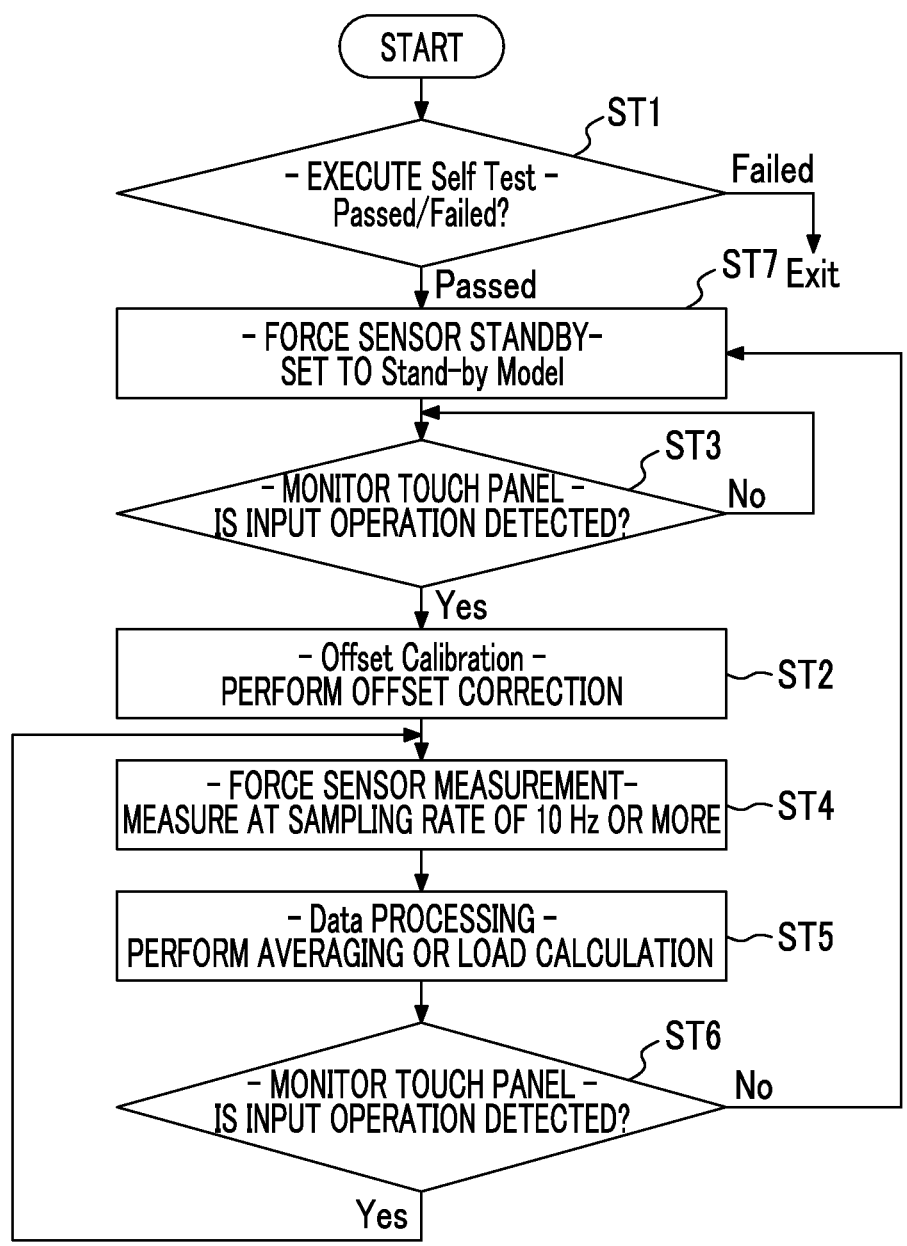
FIG. 7 is a flowchart diagram including calibration, a load detection step, and the like according to a second embodiment.

In the other flowchart illustrated in FIG. 7 (further, the same steps as those in FIG. 6 are denoted with the same reference signs), the self-test is executed (step ST1), and then, the load detection sensor 3 (force sensor) is caused to enter a standby state (step ST7). In the standby state, the load detection sensor 3 is in an operation state in which the load detection sensor 3 starts up, and in a state in which the load detection sensor 3 causes the output (second signal D2) to be extracted anytime when the host IC 7 calls the output.

Then, it is determined whether the input operation is performed or not based on the output of the capacitive touch panel sensor 2 (step ST3). That is, if it is determined that the operation body F comes in contact with the operation surface 4a as illustrated in (b) of FIG. 8 or the position coordinate (X, Y) is detected, the process transitions to the offset calibration of step ST2. If non-contact is determined or the position coordinate (X, Y) is unable to be detected, the process returns to step ST3 again to monitor the input operation state.

After step ST2 of the offset calibration, the process transitions to steps ST5 and ST6, similarly to the description in FIG. 6. In step ST6, when the input operation does not continue, that is, when the operation body F is separated from the operation surface 4a or the position coordinate (X, Y) is not detected, the process transitions from step ST6 to step ST7.

As described above, the host IC 7 (control unit) executes the offset calibration to correct the offset of the output of the load detection sensor 3 based on the input operation information resulting from the output of the capacitive touch panel sensor 2. Here, the input operation information refers to a determination as to whether the operation body F such as a finger comes in contact with the operation surface 4a or not or whether the position coordinate is detected or not. For example, in the form of FIG. 6, the offset calibration is executed in a constant period (at low sampling rate) while the input operation is not detected based on the output of the capacitive touch panel sensor 2 (see FIG. 8). On the other hand, in the form of FIG. 7, if the input operation is detected, the offset calibration is executed.

By using the input operation information resulting from the output of the capacitive touch panel sensor 2 in this way, it is possible to efficiently execute the offset calibration for the load detection sensor 3. For example, when the offset calibration is executed only at the time of supplying of power or at a start-up timing of an application, the offset calibration is not executed while the application is operating, and the offset drift is unable to be regularly cancelled.

In the input device 1 including the capacitive touch panel sensor 2 and the load detection sensor 3, the input operation is necessarily detected by the capacitive touch panel sensor 2 in a state in which the load is detected by the load detection sensor 3. That is, if there is an output from the load detection sensor 3 in a state in which the input operation is not detected by the capacitive touch panel sensor 2, the output is an offset drift. Further, when the operation surface 4a is to be pressed with the operation body F such as a finger, the operation body F first comes in contact with the operation surface 4a. Accordingly, if there is the output from the load detection sensor 3 at a moment at which a contact state is detected by the capacitive touch panel sensor 2, the output is also the offset drift or may contain the offset drift. Further, it is difficult for the offset drift to be generated, for example, in the capacitive touch panel sensor 2 that detects the XY coordinate of the operation body based on the capacitance change in comparison with the load detection sensor 3. Therefore, it is possible to execute the offset calibration regularly and accurately by using the input operation information resulting from the output of the capacitive touch panel sensor 2 as an offset calibration timing.

In the flowchart illustrated in FIG. 6, the timing of the offset calibration is when the input operation is not detected based on the output of the capacitive touch panel sensor 2, that is, when the operation body does not contact the operation surface 4a (see FIG. 8). Therefore, the offset calibration timing does not overlap an output measurement timing of the load detection sensor 3 in step ST4 illustrated in FIG. 6, and the execution of the offset calibration and the load detection can be efficiently performed (see "calibration timing in FIG. 6" illustrated in (d) of FIG. 8).

Meanwhile, in the flowchart illustrated in FIG. 7, if the input operation is detected based on the output of the capacitive touch panel sensor 2, the offset calibration is executed. Therefore, in FIG. 7, the load detection sensor 3 is in a standby state prior to the offset calibration, and if the input operation is detected based on the output of the capacitive touch panel sensor 2, the output of the load detection sensor 3 can be immediately acquired and the offset calibration can be executed (see "calibration timing in FIG. 7" illustrated in (d) of FIG. 8). Accordingly, it is possible to speedily execute the offset calibration and cause smooth transition from the offset calibration (step ST2) to the load detection (steps ST5 and ST6).

Further, the offset calibration may be executed on the condition that the input operation is detected based on the output of the capacitive touch panel sensor 2 and a predetermined load is detected by the load detection sensor 3. That is, when the contact and the pressing illustrated in (c) of FIG. 8 are determined, the offset calibration may be executed.

Further, it is preferable for the sampling rate for the output of the load detection sensor 3 at the time of the offset calibration to be a lower frequency than that of the sampling rate for the output of the load detection sensor 3 when the load is detected, as illustrated in FIGS. 6 and 7. For example, the sampling rate for the output of the load detection sensor 3 at the time of the offset calibration is set to about 1 Hz to 10 Hz, and the sampling rate for the output of the load detection sensor 3 when the load is detected is set to 10 Hz to 200 Hz. Accordingly, it is possible to reduce power consumption at the time of the calibration, to prevent loss of data for the load detection, and to perform the load detection without delay.

The input device (touch panel) 1 in this embodiment is applicable to a portable telephone, a portable information processing device, a portable storage device, a portable game device, or the like.

It should be understood by those skilled in the art that various modifications, combinations, sub-combinations and alterations may occur depending on design requirements and other factors insofar as they are within the scope of the appended claims of the equivalents thereof.

What is claimed is:

1. An input device comprising:
   an operation surface to be operated by an operation body;
   a position detection sensor configured to detect a position of an input operation of the operation body on the operation surface, the position detection sensor outputting a position detection signal indicating a detected input operation position;
   at least one load detection sensor, the load detection sensor including a sensor driving IC, the load detection sensor being configured to detect a load applied by the operation body at the input operation position and output a load detection signal indicating the load at the input operation position; and
   a control unit including a host IC connected to the position detection sensor and the load detection sensor, the control unit being configured to maintain the load detection sensor in a standby state until the input operation is detected based on the position detection signal from the position detection sensor, execute an offset calibration to correct an offset of the load detection signal when the input operation is detected, thereby making a smooth transition from the offset calibration to a load detection, and then obtain the load at the input operation position based on the load detection signal from the load detection sensor, thereby measuring the load without an offset drift when an application using the input device is being operated,
   wherein the host IC executes the offset calibration by outputting an instruction to the load detection sensor so as to correct the offset in the sensor driving IC in the load detection sensor, or storing an offset value in the host IC and calibrating with the stored offset value the load detection signal received from the load detection sensor,
   and wherein a sampling rate for the load detection signal during the offset calibration is lower than a sampling rate for the load detection signal when the load is being detected by the load detection sensor.

2. The input device according to claim 1, wherein the sampling rate of the load detection signal during the offset calibration is equal to or lower than 10 Hz.

3. A control method of an input device comprising an operation surface to be operated by an operation body, a position detection sensor configured to detect a position of an input operation of the operation body on the operation surface and output a position detection signal indicating a detected input operation position, a load detection sensor configured to detect a load applied by the operation body at the input operation position and output a load detection signal indicating the load at the input operation position, and a control unit, the method comprising:

maintaining the load detection sensor in a standby state until the input operation is detected based on the position detection signal from the position detection sensor;

executing an offset calibration so as to correct an offset of the load detection signal when the input operation is detected, thereby making a smooth transition from the offset calibration to a load detection; and obtaining, after executing the offset calibration, a load at the input operation position based on the load detection signal from the load detection sensor, thereby measuring the load without an offset drift when an application using the input device is being operated, wherein a sampling rate for the load detection signal from the load detection sensor during the offset calibration is lower than a sampling rate for the load detection signal when the load is being detected by the load detection sensor.

4. The control method according to claim 3, wherein the sampling rate of the load detection signal during the offset calibration is equal to or lower than 10 Hz.

5. An input device comprising:
an operation surface to be operated by an operation body;
a position detection sensor configured to detect a position of an input operation of the operation body on the operation surface, and output a position detection signal indicating a detected input operation position;
at least one load detection sensor configured to detect a load applied by the operation body at the input operation position and output a load detection signal indicating the load at the input operation position; and
a control unit configured to:
maintain the load detection sensor in a standby state until the input operation is detected based on the position detection signal from the position detection sensor;
execute the offset calibration to correct an offset of the load detection signal from the load detection sensor when the input operation is detected, thereby making a smooth transition from the offset calibration to a load detection; and
then obtain the load at the input operation position based on the load detection signal, thereby measuring the load without an offset drift when an application using the input device is being operated,
wherein a sampling rate for the load detection signal from the load detection sensor during the offset calibration is lower than a sampling rate for the load detection signal when the load is being detected by the load detection sensor.

* * * * *